US006761683B2

(12) United States Patent
Gryn et al.

(10) Patent No.: US 6,761,683 B2
(45) Date of Patent: Jul. 13, 2004

(54) INTEGRATED SCALE WITH UNDERLYING X-RAY TRAY

(75) Inventors: Felix J. Gryn, Landsdale, PA (US); Leo Henry Greway, Norwood, PA (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/226,885

(22) Filed: Aug. 23, 2002

(65) Prior Publication Data

US 2003/0153805 A1 Aug. 14, 2003

Related U.S. Application Data

(60) Provisional application No. 60/336,053, filed on Nov. 15, 2001, and provisional application No. 60/315,126, filed on Aug. 27, 2001.

(51) Int. Cl.[7] .................. A61G 11/00; A47B 13/00; A47B 7/00; A47C 20/02
(52) U.S. Cl. ................. 600/22; 5/603; 5/610; 5/655
(58) Field of Search ............ 600/22, 21; 378/167, 378/177, 209; 5/603, 610, 655, 694, 601

(56) References Cited

U.S. PATENT DOCUMENTS

| | | | | |
|---|---|---|---|---|
| 3,848,132 A | * | 11/1974 | Foderaro | .................... 378/209 |
| 3,991,840 A | | 11/1976 | Rawcliffe | |
| 4,038,973 A | | 8/1977 | Moore | |
| 4,067,565 A | | 1/1978 | Daniels | |
| 4,221,211 A | | 9/1980 | Brasch | |
| 4,492,279 A | | 1/1985 | Speckhart | |
| 4,617,912 A | | 10/1986 | Beer et al. | |
| 4,665,574 A | * | 5/1987 | Filips et al. | .................... 5/694 |
| 4,750,474 A | | 6/1988 | Dukhan et al. | |
| 4,885,918 A | * | 12/1989 | Vaccaro | ....................... 600/22 |
| 5,244,452 A | | 9/1993 | Vaccaro et al. | |
| 5,290,058 A | | 3/1994 | Adams et al. | |
| 5,376,761 A | | 12/1994 | Koch et al. | |
| 5,453,077 A | | 9/1995 | Donnelly et al. | |
| 5,474,517 A | | 12/1995 | Falk et al. | |
| 5,510,581 A | | 4/1996 | Angel | |
| 5,817,002 A | | 10/1998 | Donnelly et al. | |
| 5,898,817 A | | 4/1999 | Salmon et al. | |
| 5,971,914 A | | 10/1999 | Donnelly et al. | |
| 6,071,228 A | * | 6/2000 | Speraw et al. | ................. 600/22 |
| 6,155,970 A | | 12/2000 | Dykes et al. | |
| 6,296,606 B1 | * | 10/2001 | Goldberg et al. | ............. 600/22 |
| 6,611,978 B1 | * | 9/2003 | Schmidt et al. | ................ 5/603 |

FOREIGN PATENT DOCUMENTS

DE          3534559 A1     4/1987

* cited by examiner

*Primary Examiner*—Mary Beth Jones
*Assistant Examiner*—Nikita Veniaminov
(74) *Attorney, Agent, or Firm*—Barnes & Thornburg

(57) ABSTRACT

An infant support for an incubator or an infant warmer or a combination thereof is disclosed. The support comprises a frame, a mattress tray disposed above the tray, an x-ray tray and one or more weight cells having an actuator supporting the mattress tray above the frame. The x-ray tray is received in a space below the top surface of the mattress tray. The support is configured to be received on a tilt mechanism of the incubator or an infant warmer or a combination thereof to provide an inclination to the mattress tray. The support is configured to permit x-rays to be taken of an infant supported above the mattress tray and to provide an indication of the weight of the infant supported on the mattress tray regardless of its inclination.

41 Claims, 12 Drawing Sheets

INTEGRATED SCALE WITH UNDERLYING X-RAY TRAY

This application claims benefit of Provisional Application Serial No. 60/315,126 filed Aug. 27, 2001, and claims benefit of No. 60/336,053 filed Nov. 15, 2001.

The present invention relates to infant supports for incubators or infant warmers or combinations thereof, the support providing an integrated scale for weighing the infant, a tilt mechanism for tilting the infant and a receptor for an x-ray tray below the infant.

Infant care equipment such as incubators or infant warmers are well known in the prior art. U.S. patents as follows show exemplary incubators and warmers:

| U.S. Pat. No. | ISSUED |
| --- | --- |
| 4,221,211 | Sep. 9, 1980 |
| 4,492,279 | Jan. 8, 1985 |
| 4,617,912 | Oct. 21, 1986 |
| 4,750,474 | Jun. 14, 1988 |
| 5,290,058 | Mar. 1, 1994 |
| 5,376,761 | Dec. 27, 1994 |
| 5,453,077 | Sep. 26, 1995 |
| 5,474,517 | Dec. 12, 1995 |
| 5,817,002 | Oct. 6, 1998 |
| 5,971,914 | Oct. 26, 1999 |
| 6,071,228 | Jun. 6, 2000 |
| 6,155,970 | Dec. 5, 2000 |

The above listed exemplary patents show or disclose incubators or baby warmers with weighing scales or with x-ray trays. The references are incorporated herein for purposes of establishing the nature of incubators, warmers, x-ray trays, and weight scales. For example, U.S. Pat. No. 4,221,211 shows an x-ray tray incorporated into an incubator. U.S. Pat. No. 4,492,279 shows the details of a weight cell or scale for weighing infants. U.S. Pat. No. 5,453,077 discloses how an x-ray cartridge may be inserted underneath a mattress for taking x-rays of an infant.

An integrated scale and x-ray tray for use in a combination radiant heater and incubator of the type shown in U.S. Pat. Nos. 5,817,002 and 5,971,914 is described. The integrated scale integrates both a weighing scale feature and an x-ray tray feature for use in an infant support for either an incubator or an infant warmer or a combination incubator and infant warmer.

Accordingly, there is provided an infant support for an incubator or infant warmer or a combination thereof, the support comprising a frame, a mattress tray disposed above the frame, an x-ray tray, and one or more weight cells. The mattress tray, which supports a mattress for an infant thereon, is supported on the frame by the one or more weight cells. The frame provides a space therebelow for receiving an x-ray tray below the frame, mattress tray and infant supported on the mattress tray and more particularly on a mattress provided on the mattress tray. Typically, the mattress tray and frame will be made from an x-ray translucent material such as plastic material. The mattress tray and frame each have a head end, a foot end, and longitudinally extending sides. The x-ray tray is movable transversely into and out of the space under one side of the frame, although it will be appreciated that the x-ray tray may be movable into and out of the space under either side of the frame. In one illustrative embodiment, to support the x-ray tray, the frame provides longitudinally spaced, transversely extending tracks depending from the frame to slidably receive the x-ray tray. These tracks, which may be formed on the downwardly facing surface of the frame, and illustratively formed as part of the frame, provide longitudinally spaced apart, upwardly facing tracks on which the x-ray tray slides. The x-ray tray may illustratively be provided with side portions configured to engage the tracks.

In one illustrative embodiment, the mattress tray is mounted for vertical movement on the frame, and the one or more weight cells are disposed on the frame to provide an output corresponding to the weight of the mattress tray plus the infant or accessories carried by the mattress tray. The frame illustratively has a head end, a foot end and longitudinally extending sides defining four corner portions. Illustratively, a weight cell is attached to the underside of the frame at each of the four corners and a actuator is provided to extend upwardly through apertures in each corner portion of the frame. The mattress tray has its four corner portions above the frame corner portions, and the mattress tray illustratively has openings for receiving the actuators extending from the frame corner portions therebelow.

Illustratively, there is provided one weight cell disposed in association with each actuator and the actuator is coupled to a sensor supporting the mattress tray thereabove.

In a second embodiment, there is provided an infant support for an incubator or infant warmer or a combination thereof, the support comprising a frame, a mattress tray disposed above the frame, an x-ray tray, and one or more weight cells. The mattress tray, which supports a mattress for an infant thereon, is supported on the frame by the one or more weight cells. The frame and the mattress tray provide a space therebetween for receiving an x-ray tray below the mattress tray to be below the infant supported on the mattress tray and more particularly on a mattress provided on the mattress tray. Typically, the mattress tray will be made from a plastic material. The mattress tray has a head end, a foot end, and longitudinally extending sides. The x-ray tray is movable transversely into and out of the space under one side of the mattress tray, although it will be appreciated that the x-ray tray may be movable into and out of the space under either side of the mattress tray. In the second illustrative embodiment, to support the x-ray tray, the mattress tray provides longitudinally spaced, transversely extending tracks depending from the mattress tray to slidably receive the x-ray tray. These tracks, which may be formed on the downwardly facing surface of the mattress tray, and illustratively formed as part of the mattress tray, provide longitudinally spaced apart, upwardly facing tracks on which the x-ray tray slides. The x-ray tray may illustratively be provided with side portions configured to engage the tracks.

In the second illustrative embodiment, the mattress tray is mounted for vertical movement on the frame, and the one or more weight cells are disposed on the frame to provide an output corresponding to the weight of the mattress tray plus the infant or accessories carried by the mattress tray. The frame illustratively has a head end, a foot end and longitudinally extending sides defining four corner portions. A post is provided to extend upwardly from each corner portion of the frame. The mattress tray has its four corner portions above the frame corner portions, and the mattress tray illustratively has openings for receiving the posts on the frame corner portions therebelow. The mattress tray will move freely upwardly and downwardly as guided by the corner posts.

Illustratively, in the second embodiment, there is provided one weight cell disposed in association with each corner post, each weight cell comprising an upstanding sensor supporting the mattress tray thereabove.

Additional features, and advantages of the invention will become apparent to those skilled in the art upon consideration of the following detailed description of the preferred embodiment exemplifying the best mode of carrying out the invention as presently perceived.

DETAILED DESCRIPTION OF THE ILLUSTRATED EMBODIMENTS

Figure 4:
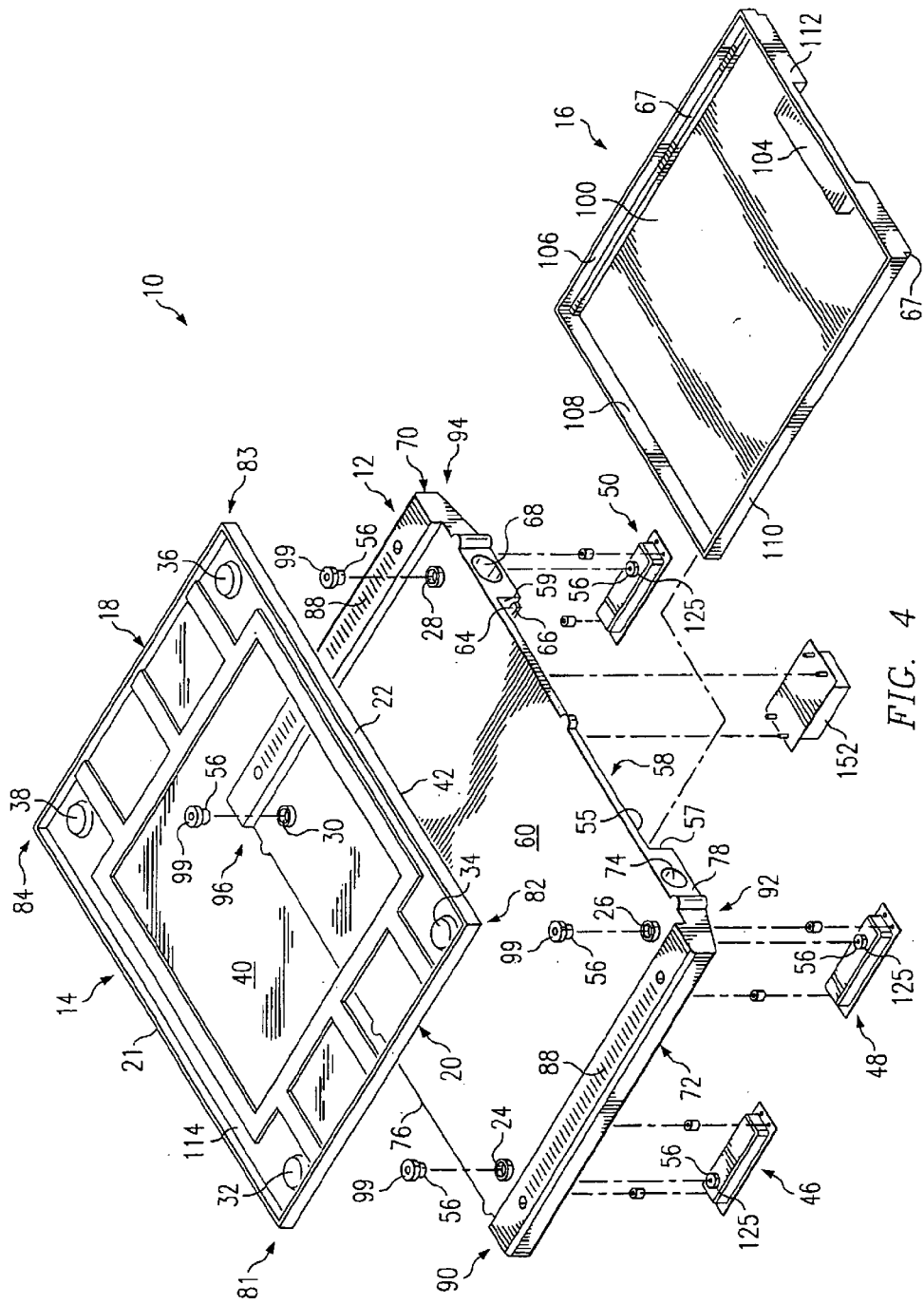
FIG. 4 shows an exploded perspective view of the first embodiment of the integrated scale assembly comprising a frame, the first embodiment of the mattress tray, and an x-ray tray to be inserted into a channel formed in the underside of the frame.

A first embodiment of an integrated scale for an infant care system 8 comprises an assembly 10 shown in FIGS. 1, 2 and 4–8, and particularly in FIG. 4. The assembly comprises a frame 12, a mattress tray 14 and an x-ray tray 16. In the illustrated embodiment, the infant care system 8 is a combination incubator and radiant warmer capable of acting as a standard incubator in a first configuration and as a standard radiant warmer in a second configuration.

Figure 1:
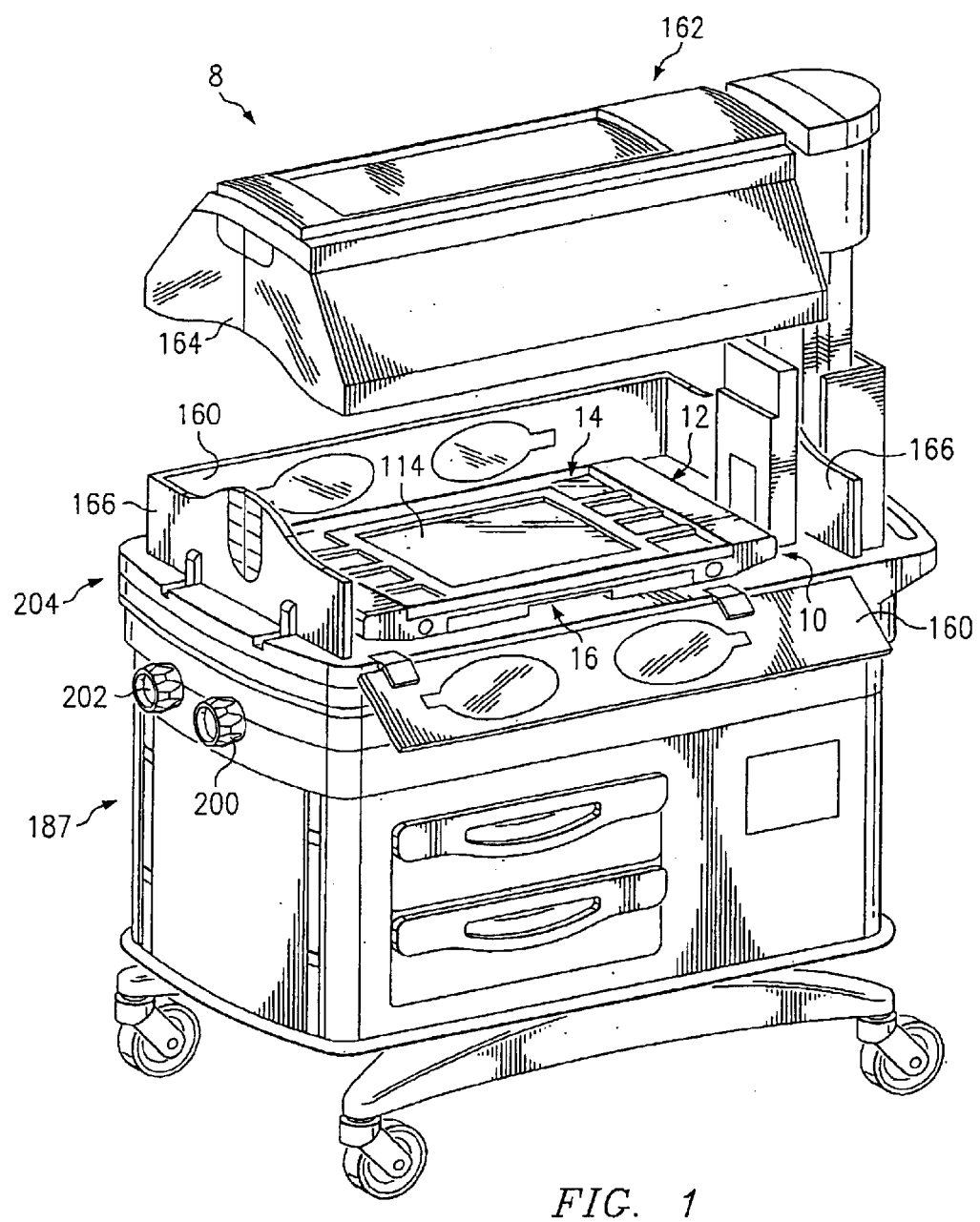
FIG. 1 is a perspective view of a combination infant incubator and radiant warmer in an intermediate configuration between the incubator configuration and the radiant warmer configuration showing side panels of the infant enclosure lowered to reveal a first embodiment of an integrated scale assembly with a first embodiment of a mattress tray.

FIG. 1 depicts the infant care system 8 in a configuration with one side panel 160 lowered to show the assembly 10. When infant care system 8 is in an incubator configuration, an overhead arm 162 is lowered so that a canopy 164 attached thereto can cooperate with the side panels 160 and end panels 166 to form an enclosure around the infant. A controlled environment can be provided in the enclosure by circulating warmed and treated air within the enclosure. When infant care system 8 is in a warmer configuration, overhead arm 162 is raised, and a radiant heater therein provides warmth to the infant on the infant support. In this configuration, much greater access is provided to the infant for treatment and care.

In either configuration, by lowering an appropriate side panel 160, access can be gained to x-ray tray 16 of integrated scale assembly 10 for insertion and removal of an x-ray film cassette 159. Typically, x-rays of the infant will be taken with the overhead arm 162 raised to the second position. While the invention is described and depicted as being utilized in a combined infant incubator and radiant warmer, it is within the scope of the disclosure for the integrated scale assemblies 10, 310 to be used in standard incubators, standard radiant warmers, and other infant support devices.

The illustrated embodiments of integrated scale assemblies 10, 310 are configured for use with an infant support device 8 having a Trendelenberg mechanism assembly 168. In the drawings, only the first embodiment of integrated scale assembly 10 is shown mounted on the Trendelenberg or tilt mechanism assembly 168. However, those skilled in the art will recognize that both first and second embodiments of integrated scale assembly 10, 310, respectively, include similar structural components identified by similar reference numerals to facilitate mounting of scale assemblies on Trendelenberg mechanism assembly 168. Thus, the manner of mounting of integrated scale assembly on Trendelenberg mechanism assembly 168 is described with respect to first embodiment of integrated scale assembly 10 only. Nevertheless, those skilled in the art will recognize that integrated scale assembly 310 is configured for similar mounting on Trendelenberg mechanism assembly 168.

Trendelenberg mechanism assembly 168 is configured to permit an integrated scale assembly 10 mounted thereon, the mattress (not shown) supported on the mattress tray 14 and an infant supported on the mattress, to be placed in a flat position, Trendelenberg position or reverse-Trendelenberg position. The illustrated Trendelenberg mechanism assembly 168, as shown, for example, in FIG. 3, includes two T-bars or lift bars, a head lift bar 170 and a foot lift bar 172, extending upwardly through openings 174, 176 in an upwardly facing surface 178 of a ducted cover 180 and openings 182, 184 of mechanism cover 186 of base 187 of infant support 8. Each T-bar 170, 172 is independently movable vertically with respect to upwardly-facing surface 178 of cover 180. Each T-bar 170, 172 includes a horizontally extending bar 188 having caps 190 attached to each end of bar 188 and a shaft 192 extending vertically downwardly from the center of horizontally extending bar 188. Horizontally extending bar 188 is received in lift bar-receiving channels 69, 75 of frame 12 as shown in FIGS. 1, 6, 10, 11, 12 as will be explained in further detail hereafter.

Figure 2:
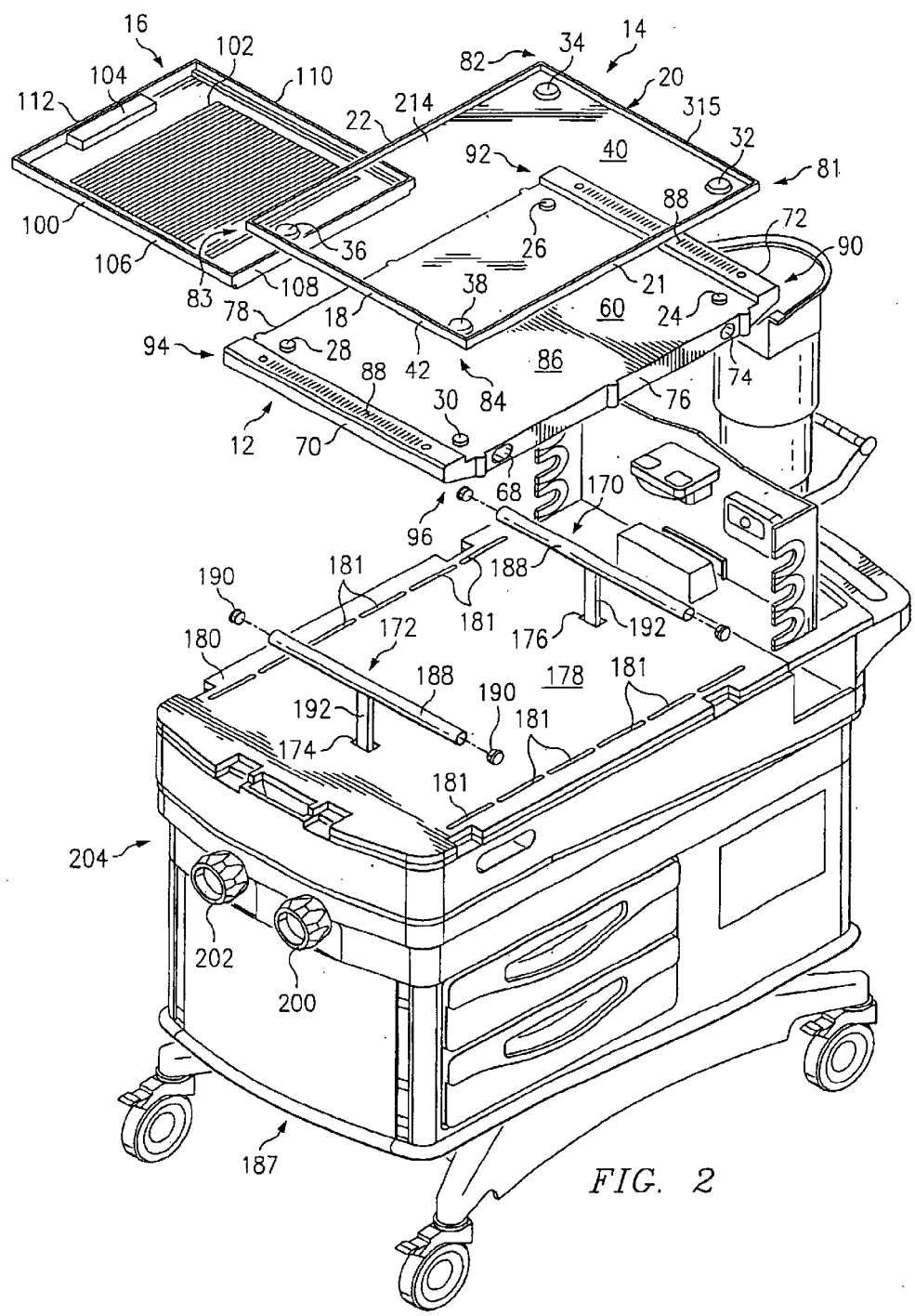
FIG. 2 is a partially exploded view of the combination infant incubator and radiant warmer with the canopy and side panels removed showing the head and platform base assembly with T-bars of a Trendelenberg mechanism extending through the upwardly facing surface of the base and showing the first embodiment of the integrated scale assembly with a second embodiment of the mattress tray.
Figure 3:
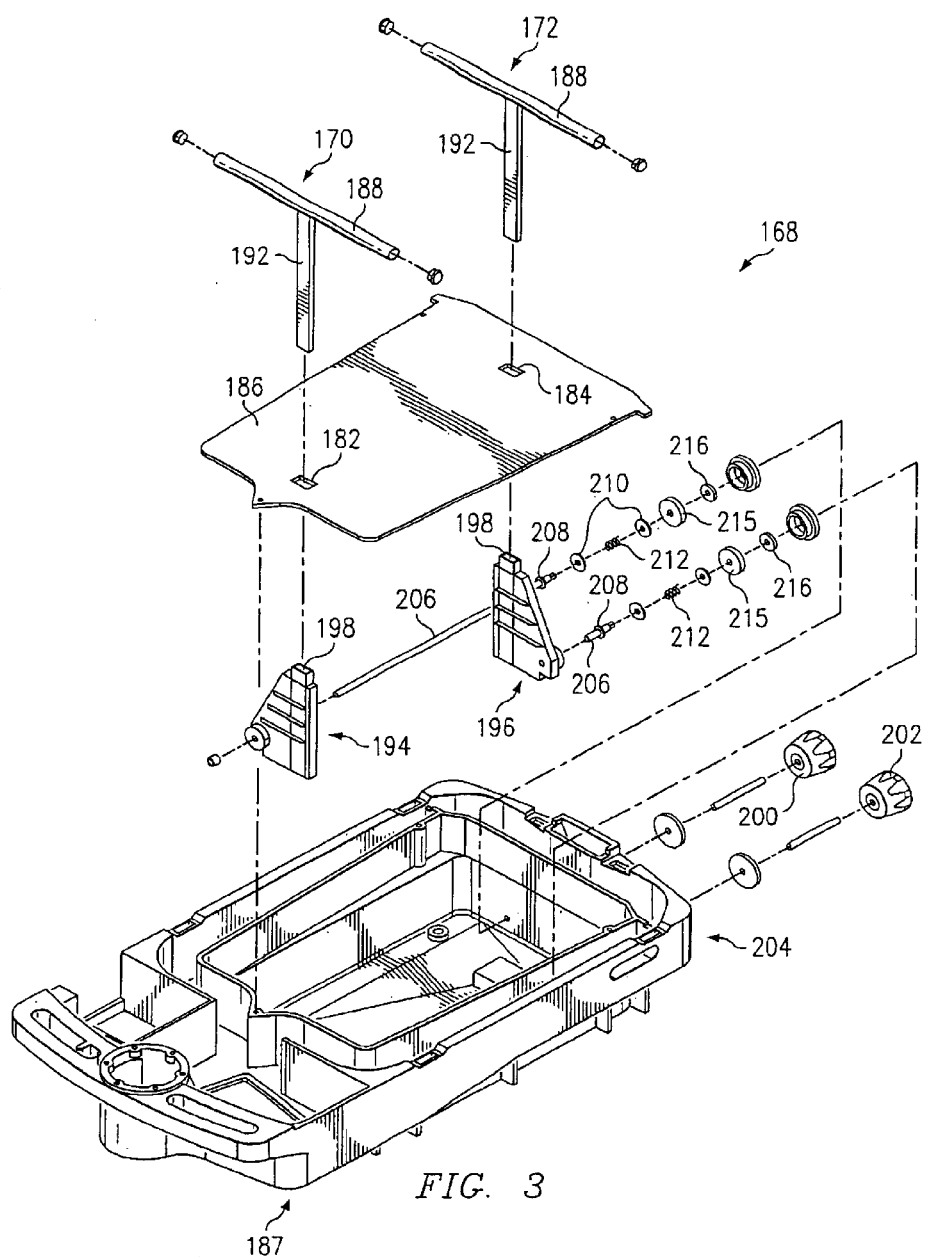
FIG. 3 is a partially exploded perspective view of the Trendelenberg mechanism assembly of FIG. 2 rotated 90 degrees and with the T-bars removed.

As shown, for example, in FIGS. 2 and 3, Trendelenberg mechanism assembly 168 includes a head tilt mechanism assembly 194 and a foot tilt mechanism assembly 196 mounted to base 187 of infant support 8 below openings 174, 176, 182, 184 in covers 180, 186, respectively. Each tilt mechanism assembly 194, 196 includes an opening 198 into which shaft 192 of a T-bar 170, 172 is received. Head and the foot tilt mechanism assemblies 194, 196 permit horizontally extending bars 188 of head and foot T-bars 170, 172 to be raised and lowered independently through reciprocal movement of shaft 192 within tilt mechanism assembly 194, 196. Thus, tilt mechanisms 194, 196 allow frame 12 supported on horizontally extending bars 188, mattress tray 14 supported above frame 12, the mattress (not shown) supported on mattress tray 14 and the infant supported on the mattress to be positioned in a flat position, Trendelenburg position and reverse Trendelenburg position.

Illustratively, independent adjustment of head and foot T-bars 170, 172 is accomplished by a caregiver turning head and foot adjustment knobs 200, 202, respectively, which extend from foot end 204 of infant support 8. Illustratively, shafts 206, rings 208, washers 210, compression springs 212, cam followers 215, cam rings 216 and other hardware form couplings between head adjustment knob 200 and head tilt mechanism 194 and foot adjustment knob 202 and foot tilt mechanism 196. Those skilled in the art will recognize that other Trendelenburg mechanisms and tilt mechanisms may be used to tilt integrated scale assembly 10 within the scope of the disclosure. Such tilt mechanisms locate frame 12 of integrated scale assembly 10 sufficiently above upwardly facing surface 178 of cover 180 to facilitate removal of x-ray tray 16 from below frame 12.

Illustratively, frame 12 is generally rectangular in shape with corner post openings 24, 26, 28, 30 extending therethrough. Mattress tray 14 is provided with downwardly opening corner actuator-receiving collars 32, 34, 36, 38 which slide down over actuators 56 extending upwardly through actuator openings 24, 26, 28, 30, respectively, to mount mattress tray 14 on frame 12. A weight measuring cell or load cell 46, 48, 50, 52 is mounted on the underside of each of the four corners of the frame 12. A actuator 56 associated with each cell 46, 48, 50, 52 extends through the associated actuator opening 24, 26, 28, 30, respectively. One end of each actuator 56 is received in actuator-receiving collars 32, 34, 36, 38 of mattress tray 14 to support mattress tray 14 above frame 12. The other end of each actuator 56 is mounted to a cantilevered beam or sensor 138 of its associated weight cell 46, 48, 50, 52. It will be appreciated that mattress tray 14 can move freely upwardly and downwardly supported on actuators 56 such that the weight of the mattress tray 14 and anything on the tray 14, including the infant and the mattress, will bear down on actuators 56 inducing deflection of cantilevered beam 138 of cells 46, 48, 50, 52.

The frame 12 includes a central panel or upwardly facing surface 60 above the x-ray tray 16 when the tray 16 is inserted into its use position. Illustratively, the underside of frame 12 is formed with a cavity 54 defined by a downwardly facing surface 55, inwardly facing, downwardly and laterally extending, spaced apart walls 57, 59 and a cut out or opening 58. Inwardly extending rails form guide tracks 62, 64 for supporting the side edge of the tray 16. As suggested in FIG. 4, each side edge of the tray 16 may be provided with a longitudinally extending track edge 67 which rests upon the adjacent track edge 66. Thus, the x-ray tray 16 is supported for movement below frame 12 from an unloaded position to its fully inserted or loaded position shown in FIGS. 1, 10, 11 and 12

In the illustrated embodiment, mattress tray 14 is formed of a clear plastic material and frame 12 is formed from a plastic material to reduce the weight of integrated scale assembly 10. Those skilled in the art will recognize that plastic materials are x-ray transparent or translucent permitting x-rays to pass therethrough to expose x-ray film located thereunder. It will be appreciated that the components 12, 14, 16 may be made from molded plastic or metal as desired, so long as an x-ray transparent or highly translucent window is formed in the portions of frame 12 and mattress tray 14 overlying an x-ray cartridge 159 received in tray 16. For example, the mattress tray 14 may be fabricated or molded from a polycarbonate material known as Lexan FL 900.

As used herein with regard to the integrated scale assembly 10, and the components 12, 14, 16 thereof, the terms head end and foot end are relative in that integrated scale assembly 10 can be oriented as desired by the caregiver to provide access to x-ray tray 16 from either side of infant support device 8. For example, FIG. 1 illustrates the integrated scale assembly 10 mounted to the infant support device 8 so that access to the x-ray tray 16 is available from one side of infant support device 8 while FIG. 2 shows the integrated scale assembly 10 oriented so that access to the x-ray tray 16 is available from the other side of infant support device 8. The terms head and foot end, when used with regard to components of the integrated scale assembly 10 will refer to the orientation depicted in FIG. 1. Those skilled in the art will recognize that the same is true of integrated scale assembly 310 and its components 312, 314, 16.

Frame 12 is illustratively formed to include downwardly extending side walls 76, 78 on each longitudinally extending side 20, 21. Each head end portion of the side wall 76, 78 is formed to include a tunnel 68. Tunnels 68 communicate with a downwardly opening head end lift bar-receiving channel 69 extending transversely across the bottom surface of the head end portion of the frame 12. Lift bar-receiving channel 69 has a generally oval cross section to aid in retention of horizontally extending bar 188 of lift bar 170 as shown for example, in FIG. 12. When horizontally extending bar 188 of lift bar 170 is received in tunnels 68 and head end lift bar-receiving channel 69, lift bar 170 slides in the longitudinal direction within tunnels 68 and head end lift bar-receiving channel 69 to accommodate tilting of frame 12 induced by Trendelenburg mechanism assembly 168. As the head end and foot end of frame 12 are raised and lowered using Trendelenburg mechanism assembly 168, frame 12 also pivots about lift bar 170.

Each foot end portion of side wall 76, 78 is formed to include a cylindrical bore 74. Cylindrical bores 74 communicate with a foot end downwardly opening lift bar-receiving channel 75 extending transversely across the foot end portion. Foot end lift bar-receiving channel 75 has a substantially semi-circular cross-section as shown, for example, in FIG. 11. The diameters 155 of lift bar-receiving channel 75 and cylindrical bores 74 are slightly larger than the diameter 157 of horizontally extending bar 188 of lift bar 172. As the head end and foot end of frame 12 are raised and lowered using Trendelenburg mechanism assembly 168, frame 12 pivots about lift bar 172. Tunnels 68, head end lift bar-receiving channel 69, bores 74 and foot end lift bar-receiving channel 75 are provided for mounting frame 12 on incubator warmer 8 on a tilt mechanism 168 of the type partially disclosed herein and more fully disclosed in co-pending application Ser. No. 09/955,850, filed Sep. 19, 2001, the disclosure of which is incorporated herein by this reference.

Frame 12 is mounted on lift bars 170, 172 of Trendelenburg mechanism assembly 168 by initially tilting frame 12 and inserting a first end of bars 188 into the tunnel 68 and bore 74 on a first side of frame 12. Frame 12 is then slid laterally along bars 188 until bottom walls 71, 77 of tunnel 68 and bore 74, respectively, on the other side of frame 12 extend beyond the other end of horizontally extending bars 188. Frame 12 is then lowered to allow bars 188 to be received in head end and foot end lift bar-receiving channels 69, 75. Frame 12 is then slid laterally in the opposite direction until second ends of horizontal bars 188 are received in the tunnel 68 and bore 74 on the opposite side of frame 12. In this position integrated scale assembly 10 is centered within infant support device 8 and air exiting through ducts 181 from base 187 into the interior of the enclosure can pass unobstructed along the sides of integrated scale assembly 10.

Once mounted on lift bars 170, 172, frame 12 is free to slide transversely with respect to infant support device 8. Typically, frictional forces between horizontally extending bars 188 and frame 12 retain frame 12 in a position selected by a caregiver. However, when the caregiver wishes to reposition integrated scale assembly 10, the frictional forces can be overcome with a push or a pull. Thus, when side panels 160 are lowered, integrated scale assembly 10, along with the mattress and infant supported thereon, can be slid partially in and out of the enclosure. Lateral sliding movement of integrated scale assembly 10 is limited by engagement of shaft 192 of lift bars 170, 172 with interior side walls 73, 79 of tunnels 68 and bores 74, respectively.

At least one sidewall of the frame 12 is provided with a cut-out or opening 58 to provide entry into cavity or space 54. It will be appreciated that frame 12 may be constructed with a similar opening 58 in side 76 SO that tray 16 can be inserted under frame 12 from either side. It will also be appreciated that cut out or opening 58 is positioned between mounting locations for weight cells 46, 48, 50, 52 and lift bar-receiving channels 69, 75 on the head end portion and foot end portion respectively of frame 12 as weight cells 46, 48, 50, 52 and lift bars 170, 172 may not be x-ray translucent and could adversely affect an x-ray.

It will also be appreciated that inserting x-ray tray 16 under the downwardly facing surface of frame 12 is advantageous as compared to, for example, inserting an x-ray cartridge 159 under the mattress that fits on mattress tray 14. The insertion of tray 16 into space 54 on tracks 62, 64 does not disturb the infant or any of the accessories and instrumentation to which the infant is connected.

Figure 5:
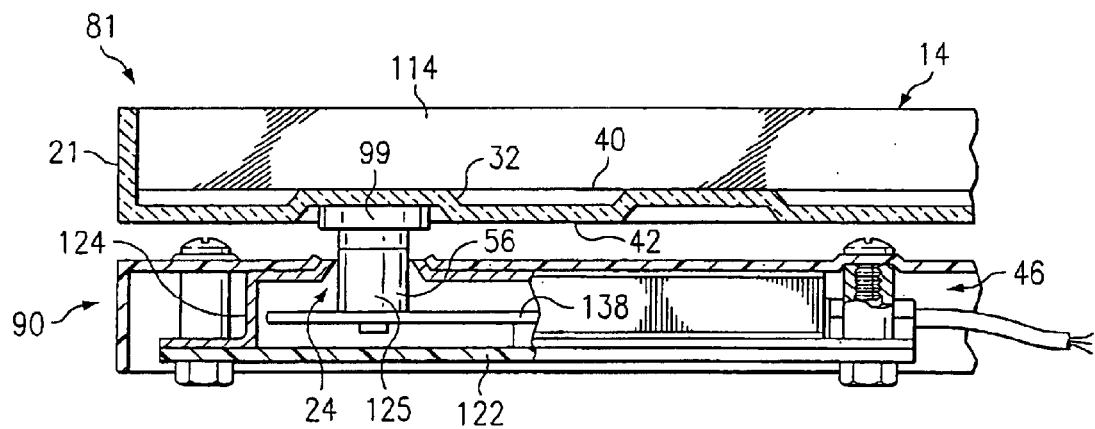
FIG. 5 is a fragmentary sectional view taken along line 5—5 of the assembled assembly of FIG. 4 along line 5—5.
Figure 6:
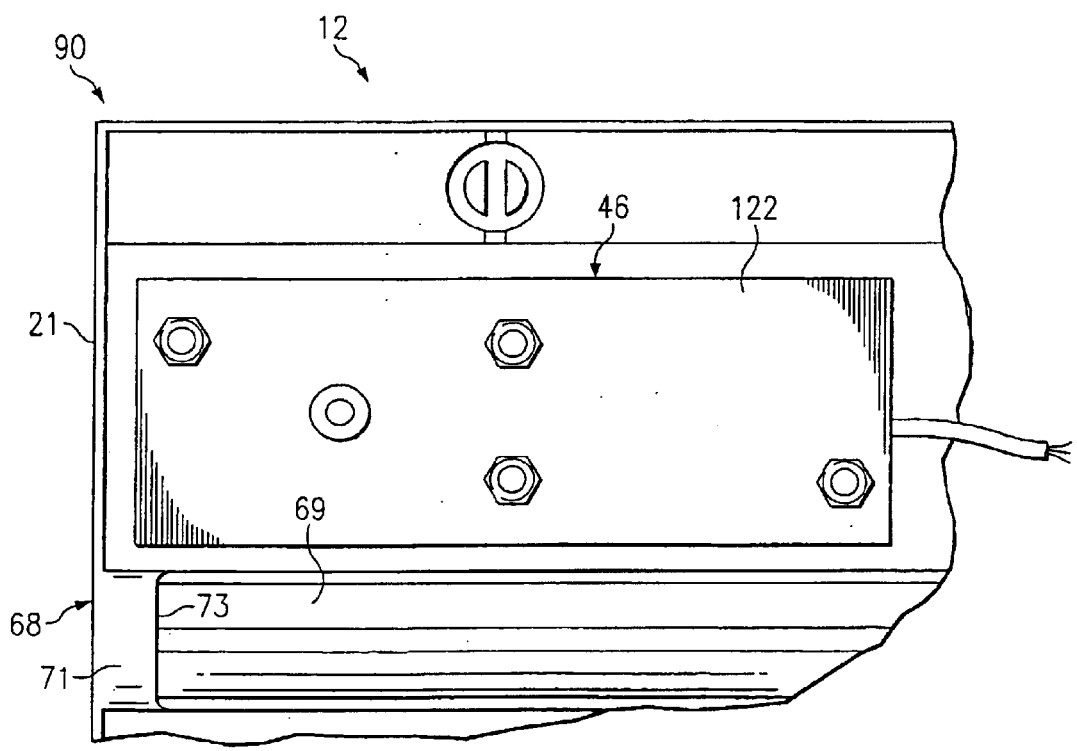
FIG. 6 is a bottom plan view of a corner of the frame with the T-bar of the tilt assembly supporting the frame and a weight cell mounted to the frame.
Figure 7:
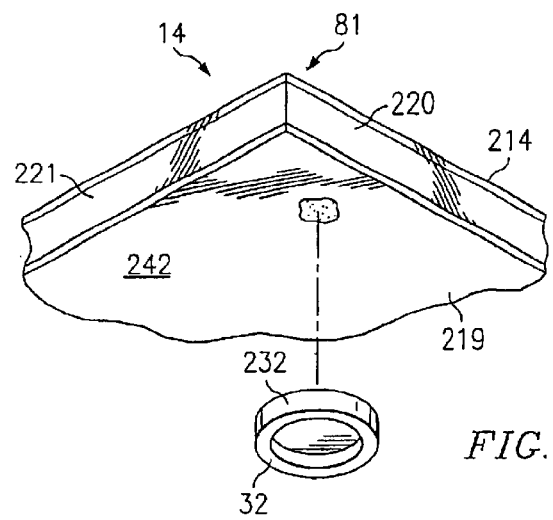
FIG. 7 is a bottom perspective exploded view of a corner of the second embodiment of the mattress tray showing rings attached to the bottom surface of the tray to receive actuators extending from a weight cell.
Figure 8:
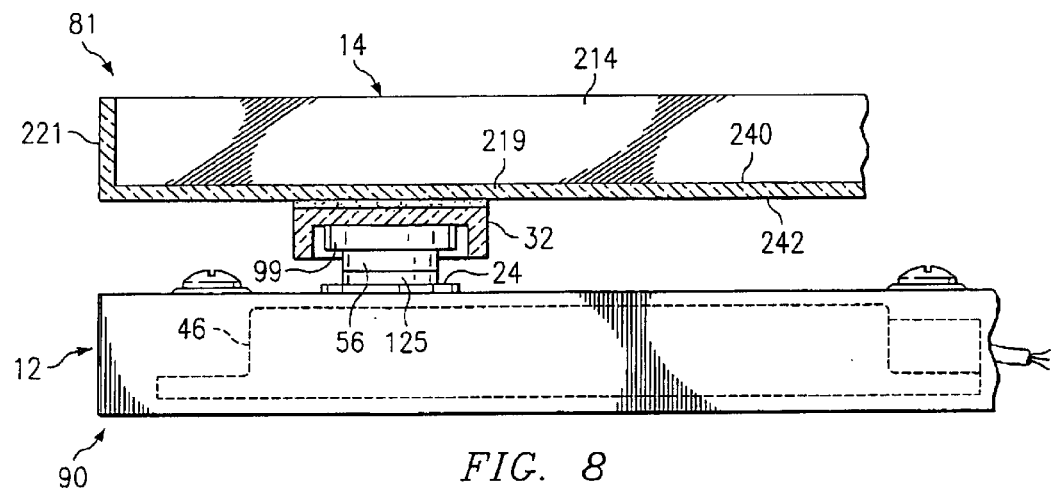
FIG. 8 is an end elevation view of the second embodiment of the mattress tray with parts broken away and the frame showing a weight cell in phantom lines.

Two embodiments of mattress tray 14 are illustrated in the drawings. FIGS. 1, 4 and 5 illustrate a molded mattress tray 114 and FIGS. 2, 7 and 8 illustrate an assembled mattress tray 214. Each embodiment of mattress tray 14 includes a head end 18, foot end 20 and longitudinally extending sides 21, 22. The tray 14 has an upwardly facing surface 40 and a downwardly facing surface 42.

The molded tray 114 is formed to include circular downwardly opening cavities acting as actuator-receiving collars 32, 34, 36, 38 for receipt of actuators 56. Molded tray 114 includes structural features to reinforce tray 14. Those skilled in the art will recognize that the portion of molded tray 114 overlying x-ray tray 16 received in frame 12 is substantially planar on both the upwardly facing surface 40 and downwardly facing surface 42 to minimize refraction of x-rays passing therethrough.

Illustratively, assembled mattress tray 214 includes a rectangular sheet 219 of plexiglass and upwardly extending side walls 221, 222 and end walls 218, 220. Rectangular sheet 219 includes an upwardly facing surface 240 for supporting a mattress thereon and a downwardly facing surface 242 to which actuator-receiving collars 232, 234, 236, 238 are glued or otherwise mounted for receiving actuators 56 extending upwardly from frame 12. Side walls 221, 222 and end walls 218, 220 extend upwardly from rectangular sheet 219 to retain mattress (not shown) on rectangular sheet 219 when integrated scale assembly 10 is tilted.

It will also be appreciated that frame 12 is configured such that upwardly facing surface 86 of frame 12 is vertically offset from mattress tray 14 to prevent tray 14 from contacting frame 12 when tray 14 is loaded resulting in deflection of beams 138 of load cells 46, 48, 50, 52. Contact between tray 14 and frame 12 would induce error in the weight readings calculated from the weight cell outputs.

Frame 12, therefore, has a head end 70, foot end 72, longitudinally extending sides 76, 78 defining corner portions 90, 92, 94, 96. Weight cells 46, 48, 50, 52 are mounted to the underside of frame 12 in four corner portions 90, 92, 94, 96. Actuator openings 24, 26, 28, 30 are formed in each of corner portions 90, 92, 94, 96 above each of the mounting locations of weight cells 46, 48, 50, 52 to permit actuators 56 to extend from each load cell 46, 48, 50, 52 through actuator openings 24, 26, 28, 30, respectively, to support mattress tray 14. Each actuator 56 may be formed from plastic or metal and be attached, such as by rivets or screws, to cantilevered beam 138 of a load cell 46, 48, 50, 52 so as to extend upwardly through actuator openings 24, 26, 28, 30 in frame 12. Each actuator 56 may illustratively be provided with a cap 99 attached to the tray-engagement end of actuator 56. Cap 99 is sized to be received in a actuator-receiving collar 32, 34, 36, 38 of mattress tray 14.

Similarly, mattress tray 14 has its head end 18 and foot end 20 with longitudinally extending sides 21, 22 defining corner portions 81, 82, 83, 84 above corner portions 90, 92, 94, 96, respectively. Tray 14, therefore, rests on actuators 56 extending upwardly from frame 12 through actuator openings 24, 26, 28, 30. Tray-supporting ends of actuators 56 or caps 99 attached to tray-supporting ends are received in actuator-receiving collars 32, 34, 36, 38. Since tray 14 is supported by actuators 56, its weight rests on the cantilevered beam 138 of the weight cells 46, 48, 50, 52. The combined output of weight cells 46, 48, 50, 52, therefore, sums the weight on tray 14, the mattress thereon, the infant on the mattress and the accessories on tray 14. A tilt module 152 is also attached to frame 12 to measure the degree of tilt of integrated scale assembly 10. Integrated scale assembly 10 may be used with a controller running an algorithm such as that disclosed in co-pending U.S. application Ser. No. 09/813,190 filed Mar. 20, 2001 entitled Patient Weighing Device, assigned to the common assignee of the present invention. Thus, the output of tilt module 152 is used to correlate the outputs of weight cells 46, 48, 50, 52 to provide an accurate measure of the weight supported on integrated scale assembly 10 regardless of the inclination of mattress tray 14.

Mattress tray 14 and, for that matter, frame 12 may be provided with various vent openings (not shown) for airflow from the convective heater associated with the system.

X-ray film tray or x-ray tray 16 is formed as a shallow pan-like structure 100 for receiving x-ray film 159. Pan 100 has a handle 104 for use in inserting tray 16 into space 54. FIG. 4 shows tray 16 with sides or side edges 106, 110 and end edges 108, 112 with handle 104 being illustratively formed in edge 112. It will be appreciated that tray 16 may be molded from plastic. Illustrated x-ray tray 16 includes labels attached to the upwardly facing x-ray-receiving surface 101 thereof that includes grid markings 102, as shown for example, in FIGS. 2 and 16. As shown for example, in FIGS. 2 and 4, frame 12 is formed to include a ruled scale including indicators lines 88 extending laterally across head and foot end of frame 12. Indicator lines 88 of ruled scale correspond to grid markings 102 adhered to x-ray tray 16 to facilitate proper positioning of x-ray film 159 received in x-ray tray 16 in relation to an infant on a mattress held on mattress tray 14.

Figure 9:
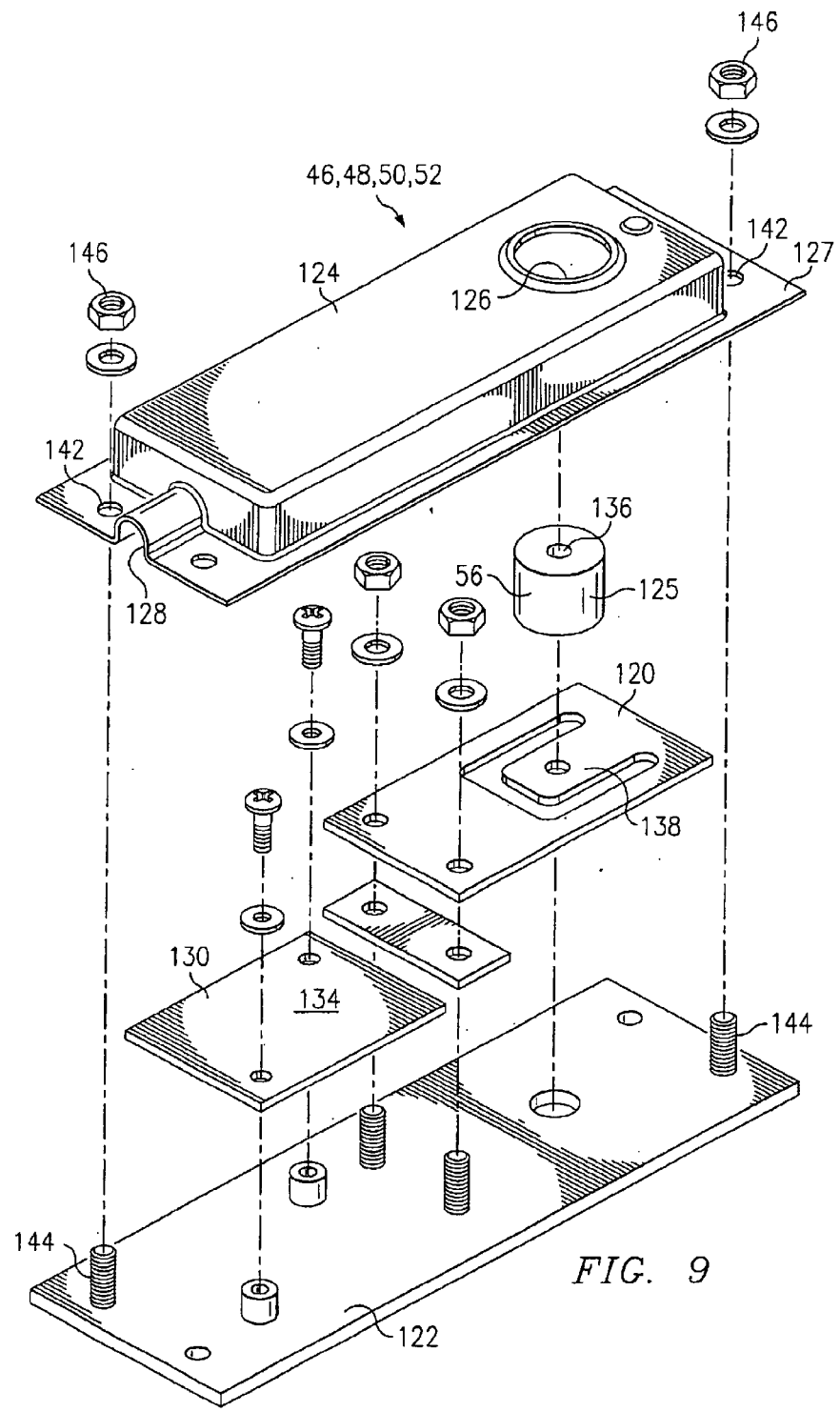
FIG. 9 shows an exploded perspective view of an illustrative weight cell.
Figure 10:
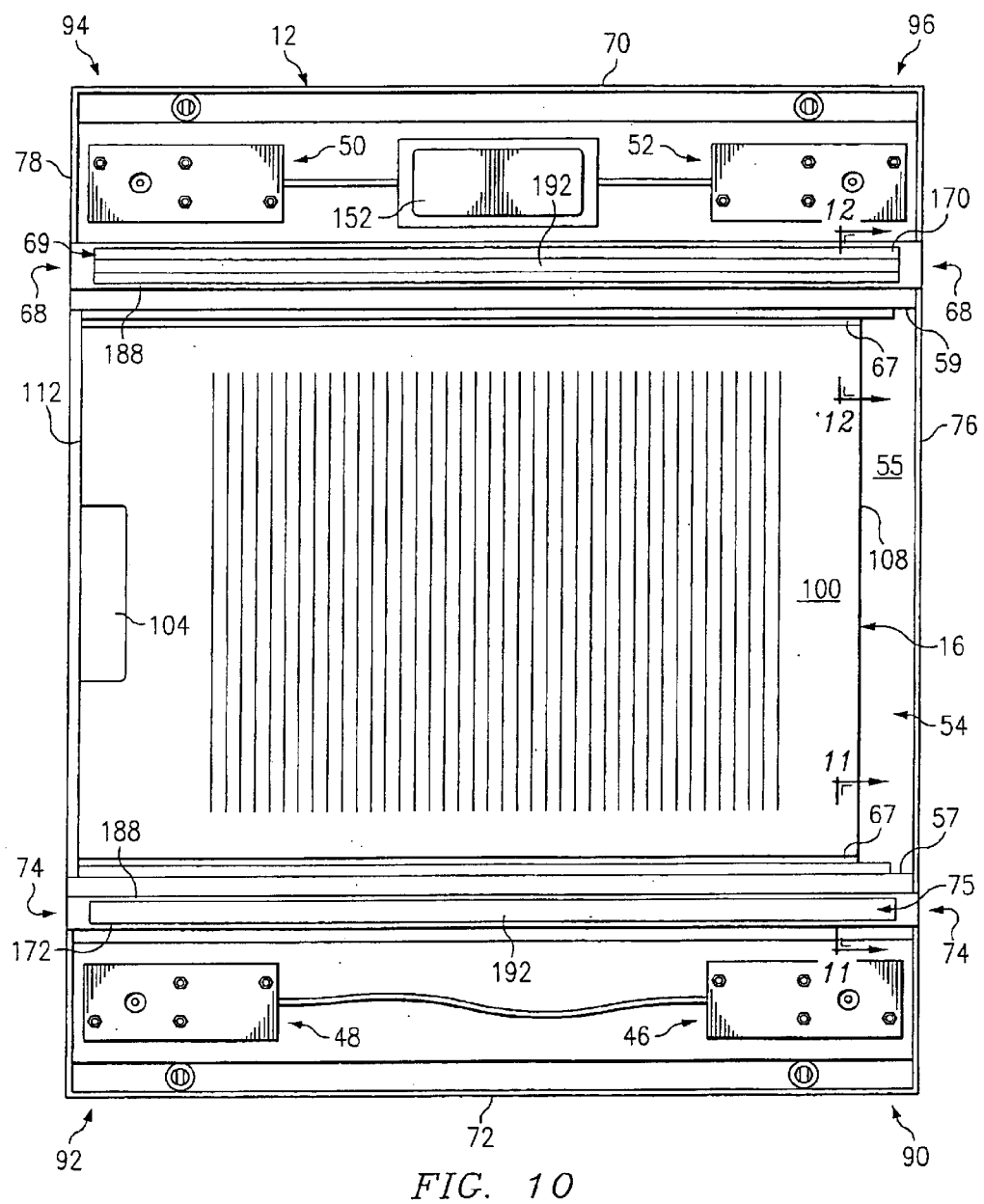
FIG. 10 is a bottom plan view of the x-ray tray received in the frame supported by the T-bars of the Trendelenberg mechanism assembly.
Figure 11:
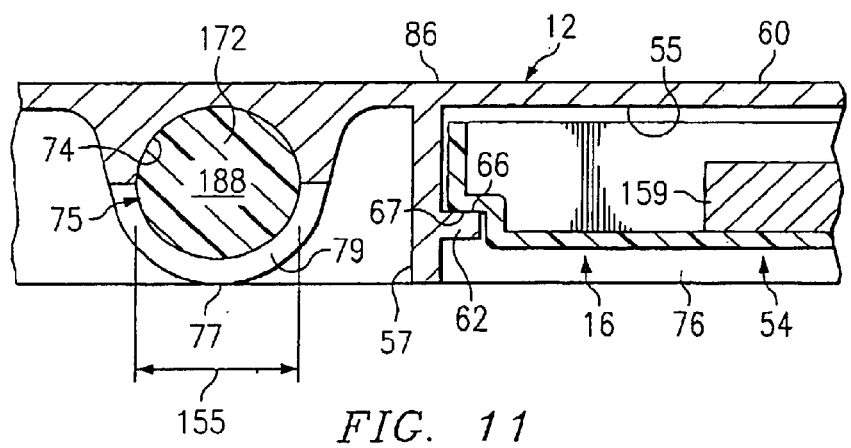
FIG. 11 is a partial sectional view along line 11—11 of FIG. 10.
Figure 12:
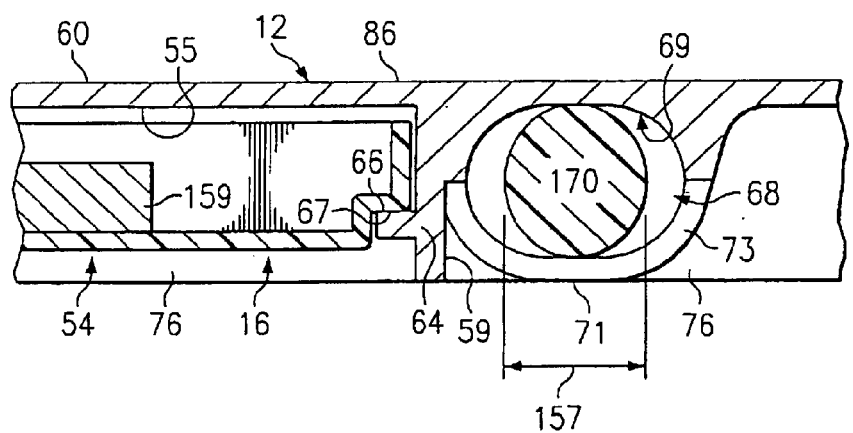
FIG. 12 is a partial sectional view along line 12—12 of FIG. 10.

Referring specifically to FIG. 9, there is shown an illustrative weight cell 46, 48, 50, 52 which may be used in disclosed integrated scale assembly 10 for infant care system 8. Weight cells are well known sensor devices to those skilled in the art. One illustrative example of a weight cell is illustrated and described in U.S. patent application Ser. No. 09/813,190 filed Mar. 20, 2001 entitled Patient Weighing Device, assigned to the common assignee of the present invention. The disclosure of U.S. patent application Ser. No. 09/813,190 is incorporated herein by this reference.

In the illustrated embodiment, each weight cell 46, 48, 50, 52 includes a weight cell housing 124 and associated base plate 122 one of each of which is oriented in each quadrant of an infant mattress tray 14. Illustratively, the apparatus includes four weight cells 46, 48, 50, 52 mounted to the underside of frame 12 in a quadrilateral orientation and having a actuator 56 extending between mattress tray 14 and frame 12. Further illustratively, four weight cells 46, 48, 50, 52 are oriented in a rectangle. Those skilled in the art will recognize that fewer or more weight cells 46, 48, 50, 52 in non-rectangular orientations are within the scope of the disclosure.

Referring to FIG. 9, each weight module housing 124 is somewhat inverted basin-shaped, and includes a mounting flange 127 formed to include a passage way 128. Mounting flange 127 is mounted to base plate 122 which is in turn mounted to frame 12. Each weight module housing 124, when so mounted, defines a passageway 128 between flange 127 and base plate 122 through which electrical conductors for its respective weight cell 46, 48, 50, 52 pass. Illustratively, weight module housing 124 and base plate 122 are fabricated from Aluminum 3003 H14 with a gold chromate finish. Weight module housing 124 and base plate 122 are fabricated from conductive material so that when weight module housing 124 is mounted to base plate 122, a Faraday cylinder is formed.

Illustratively, weight module housing 124 includes a plurality of holes 142 through which studs 144 of plate 122 extend. Illustratively, studs 144 are threaded to receive a washer and nut 146 which secures weight module housing 124 to plate 122. Those skilled in the art will recognize that other fasteners, such as rivets, screws, bolts and nuts may be used to secure housing 124 to plate 122.

Electrical components of each weight cell 46, 48, 50, 52 are housed in this Faraday cylinder to shield the components from electromagnetic interference generated by external components and to shield the external components from electromagnetic interference generated by the weight module components. Each weight module housing 124 is electrically coupled to each other weight module housing 124 by ground conductors in cables. Illustratively, base 122 is electrically coupled to ground potential through cable. It is within the scope of the disclosure for weight module housing 124 and plate 122 to be fabricated from other materials, however, if the benefits of shielding the electrical components are to be realized, such component should be fabricated to form a Faraday cylinder enclosing the electrical components of weight cell 46, 48, 50, 52.

Each weight module housing 124 houses a load beam 120 and an associated electrical circuit 130 provided on a printed circuit board 134. Loads are transferred to load beams 138 through shock mount portion 125 of actuator 56 mounted by threaded studs (not shown) on cantilevered beam 138 of load cell 120. Shock mount portion of actuator 56 extends through an aperture 126 in weight module housing 124 and actuator openings 24, 26, 28, 30 in frame 12. Illustratively a cap 99 is screwed to shock mount portion 125 to engage bottom surface 42 of tray 14.

Figure 13:
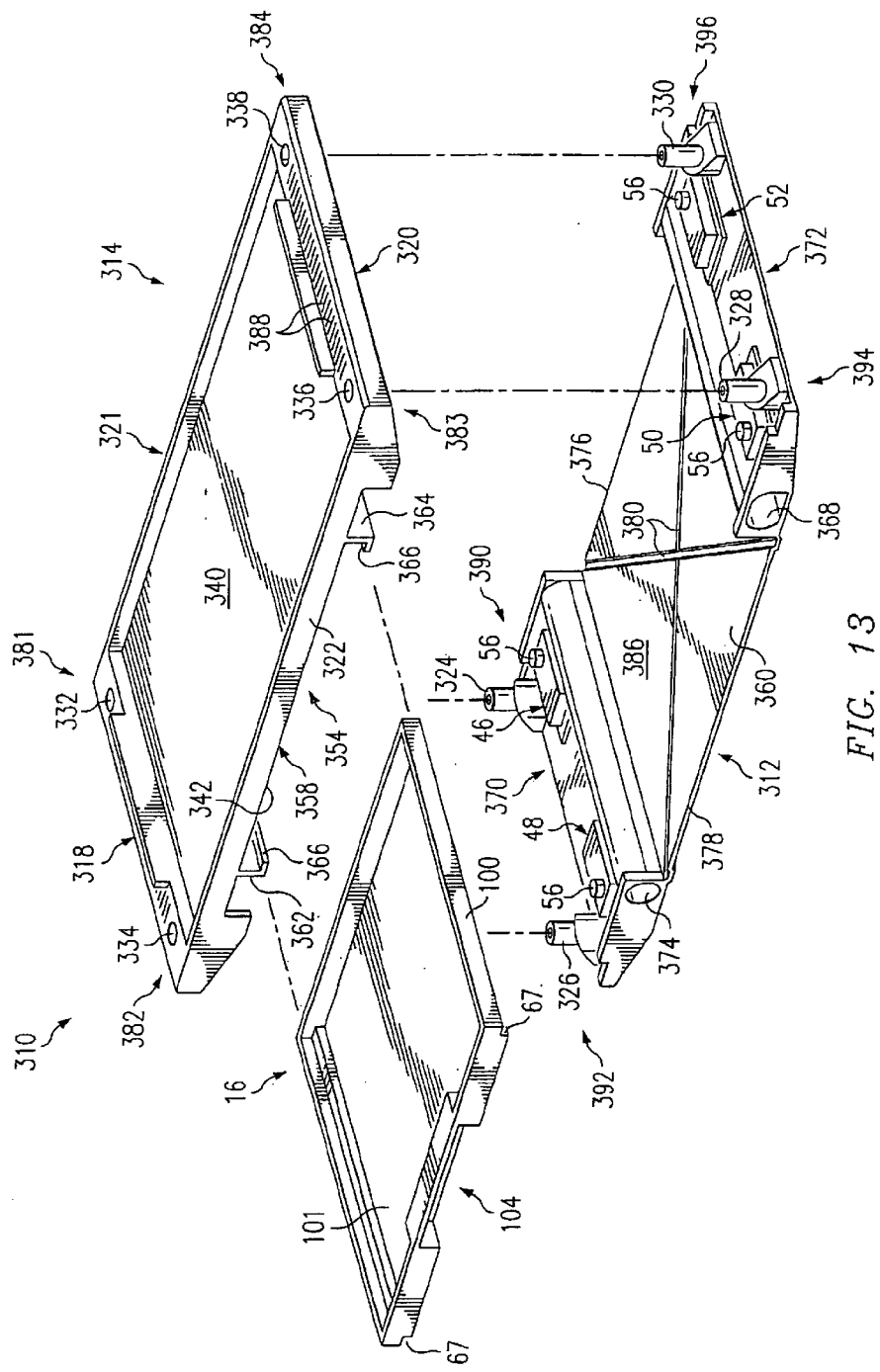
FIG. 13 shows an exploded perspective view of a second embodiment of an integrated scale assembly comprising a subframe, a mattress tray, and an x-ray tray to be inserted into the space between the subframe and the mattress tray.
Figure 14:
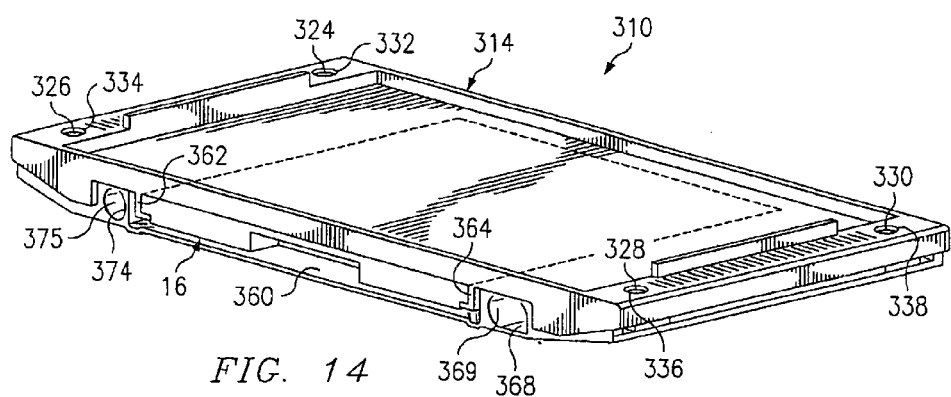
FIG. 14 is a perspective view showing the components of FIG. 13 assembled together.

A second embodiment of an integrated scale for an infant care system comprises an assembly 310 shown in FIGS. 13 and 14 with assembly comprising a subframe 312, a mattress tray 314 and an x-ray tray 16. These components are shown assembled in FIG. 14 with x-ray tray 16 disposed between mattress tray 314 and subframe 312.

Illustratively, frame or subframe 312 is a panel-like member, generally rectangular in shape with upstanding corner posts 324, 326, 328 and 330. Mattress tray 314 is provided with corner openings 332, 334, 336, 338 which slide down over posts 324, 326, 328, 330, respectively, to mount mattress tray 314 on frame 312. A weight measuring cell or load cell 46, 48, 50 and 52 is mounted on each of the four corners of subframe 312, each cell having an upstanding actuator or sensing member 56. It will be appreciated that mattress tray 314 can move freely upwardly and downwardly as guided by posts 324, 326, 328, 330 in corner openings 332, 334, 336, 338 such that the weight of mattress tray 314 and anything on tray 314, including the infant and the mattress, will bear down on actuators 56 of cells 46, 48, 50, 52.

Frame 312 includes a central panel or upwardly facing surface 360 below x-ray tray 16 when tray 16 is inserted into its use position. Illustratively, tray 314 provides downwardly extending guide tracks 362, 364 for tray 16, each track 362, 364 being provided, at its lower edge, with an inwardly turned track edge 366 (best seen in FIG. 15) for supporting the side edge of tray 16. As suggested in FIGS. 13 and 15, each side edge of tray 16 may be provided with a longitudinally extending track edge 67 which rests upon adjacent track edge 366. Thus, x-ray tray 16 is supported for movement on mattress tray 12 from its unloaded position, shown in FIG. 13, to its fully inserted or loaded position, shown in FIG. 14.

It will be appreciated that components 312, 314, 16 may be made from molded plastic or metal as desired. However, those portions overlying x-ray tray 16, and more particularly an x-ray cassette 159 received in x-ray tray 16, should be formed of x-ray transparent or translucent material. For example, mattress tray 314 may be fabricated or molded from a polycarbonate x-ray translucent material known as Lexan FL 900 while frame 312 may be formed from an aluminum alloy, for example, an aluminum alloy sheet of eight gage thickness.

Subframe 312 is illustratively formed with tunnels 368 on each side communicating with a lift bar-receiving channel 369 extending transversely across one end. Subframe 312 is also formed to include cylindrical bores 374 on each side communicating with a lift bar-receiving channel 375 extending transversely across the other end. Tunnels 368, bores 374 and lift bar-receiving channels 369, 375 are provided for mounting subframe 312 on the incubator warmer on a tilt mechanism of the type shown in FIGS. 1–3 or of the type disclosed in copending application Ser. No. 09/813,190, filed Mar. 20, 2001.

In the exploded perspective view of FIG. 13, it will be seen that mattress tray 314 has a head end 318, foot end 320 and longitudinally extending sides 321, 322. Tray 314 has an upwardly facing surface 340 and a downwardly facing surface 342 from which tracks 362, 364 depend. Side 322 of mattress tray 314 and side 378 of frame 312 provide an opening therebetween for slidably receiving x-ray tray 16. Illustratively, side 322 of tray 314 is provided with a cut-out or opening 358 to provide entry into space 354. It will be appreciated that tray 314 may be constructed with a similar opening 358 in side 321 so that tray 16 can be inserted under mattress tray 314 from either side.

It will also be appreciated that inserting x-ray tray 16 under downwardly facing surface 342 of tray 314 is advantageous as compared to, for example, inserting an x-ray cartridge under the mattress that fits on mattress tray 314. The insertion of tray 16 into space 354 on tracks 362, 364 does not disturb the infant or any of the accessories and instrumentation to which the infant is connected. It will also be appreciated that frame 312 is configured such that upwardly facing surface 386 of frame, which together with downwardly-facing surface 342 of tray 314 defines space 354, is somewhat vertically offset from its end portions or portions which mount on load cells 46, 48, 50, 52. Central panel 360 of frame 312 which provides upwardly facing surface 386 is bounded by sides 376, 378 and ends provided by the exteriors of tunnel 368 and bore 374. Since frame 312 may be made from relatively thin aluminum sheet, it may be stiffened with a pattern indicated at 380. Additionally, the side edges indicated at 376, 378 may be formed with upwardly or downwardly formed edges to provide stiffness as suggested in FIG. 13.

Frame 312, therefore, has a head end 370, foot end 372, longitudinally extending sides 376, 378 defining corner portions 390, 392, 394, 396 which support upwardly-extending posts 324, 326, 328, 330 as well as load cell 46, 48, 50, 52 associated with each post. Each post 324, 326, 328, 330 may be formed from plastic or metal and attached by rivets or screws to frame 312 to extend upwardly. Each post 324, 326, 328, 330 may illustratively be provided on a small platform as illustrated best in FIGS. 13 and 15 for attachment with fastening elements (not shown) to frame 312.

Similarly, mattress tray 314 has its head end 318 and foot end 320 with longitudinally extending sides 321, 322 defining corner portions 381, 382, 383, 384 above frame 312 corner portions 390, 392, 394, 396, respectively. Tray 314, therefore, rests on frame 312 for slight vertical movement on posts 324, 326, 328, 330 which are slidably received in openings 332, 334, 336, 338. While tray 314 is movable on posts 324, 326, 328, 330, its weight rests on sensors 56 of weight cells 46, 48, 50, 52. The combined output of weight cells 46, 48, 50, 52, therefore, sums the weight on tray 314, the mattress thereon, the infant on the mattress and the accessories on tray 314.

Mattress tray 314 and, for that matter, frame 312 may be provided with various vent openings (not shown) for airflow from the convective heater associated with the system.

Figure 15:
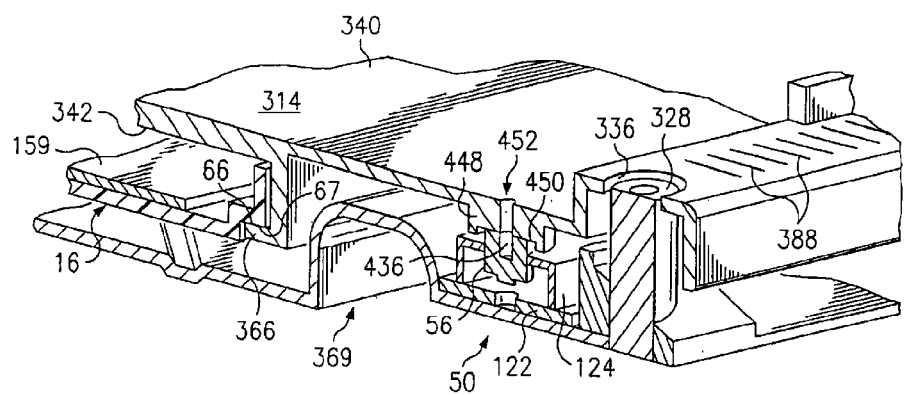
FIG. 15 is a fragmentary sectional view showing an end portion of the assembly in FIG. 14; and, FIG. 16 is a view of the x-ray tray assembly.
Figure 16:
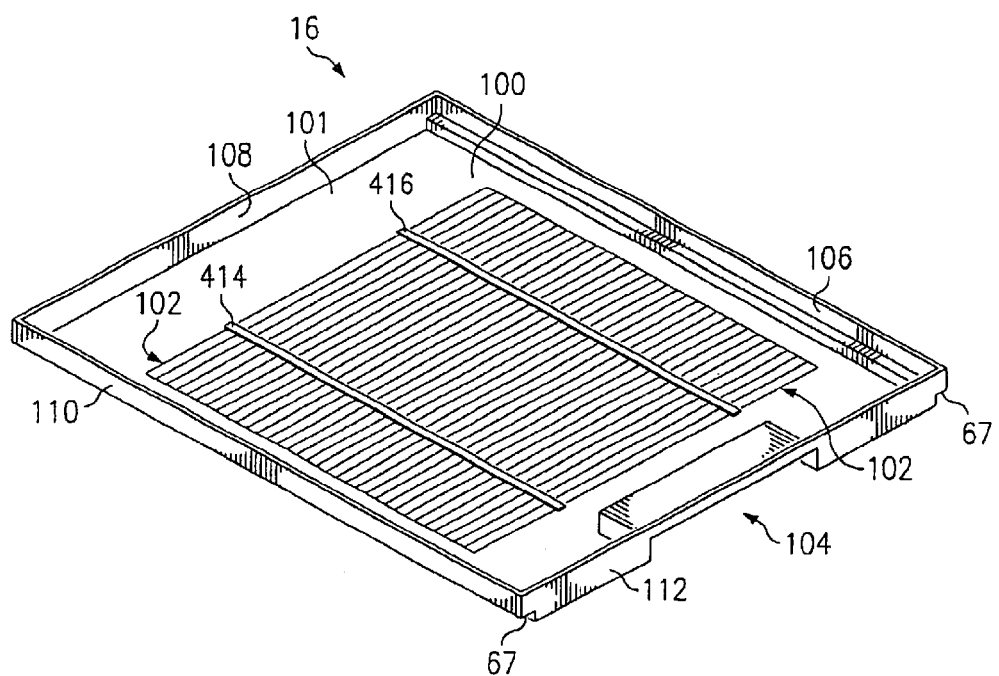

X-ray tray 16 is formed as a shallow pan-like structure 100 for receiving x-ray film 159. Pan 100 has a handle 104 for use in inserting tray 16 into space 354. FIG. 16 shows tray 16 with sides or side edges 106, 110 and end edges 108, 112 with handle 104 being illustratively formed in edge 112. It will be appreciated that tray 16 may be molded from plastic. Illustrated x-ray tray 16 includes labels attached to the upwardly facing x-ray-receiving surface 101 thereof that includes grid markings 102, as shown for example, in FIGS. 2 and 16. As shown for example, in FIG. 15, mattress tray 314 is formed to include a ruled scale including indicators lines 388 extending laterally across head and foot end of mattress tray 314. Indicator lines 388 of ruled scale correspond to grid markings 102 adhered to x-ray tray 16 to facilitate proper positioning of x-ray film 159 received in x-ray tray 16 in relation to an infant on a mattress held on mattress tray 14. Strips of non-skid tape 414, 416 are attached to x-ray-receiving surface 101 of x-ray tray 16 to prevent x-ray film cassette 159 from sliding on x-ray-receiving surface 101 of x-ray tray 16 while x-ray tray 16 is being moved into space 354.

Each weight module housing 124 houses a load beam 120 and an associated electrical circuit 130 provided on a printed circuit board 134. Loads are transferred to load beams 138 through sensor or shock mount 56 mounted by threaded studs (not shown) on cantilevered beam 138 of load cell 120. Sensor 56 extends through an aperture 126 in weight module housing 124 to engage the bottom surface of tray 314. As shown in FIG. 15, the bottom of infant mattress tray 314 is illustratively formed to include downwardly extending mounting bosses 448 formed to include recesses 450 sized to receive sensor 56. Tray 314 is also formed to include a mounting hole 452 which aligns with threaded opening 436 of sensor 56 when tray 314 rests on sensor 56. Infant mattress tray 314 may be mounted to sensor 56 by fasteners (not shown) which extend through mounting hole 452 in mattress tray 314 and into threaded opening 436 provided therefore on the top surface of sensor 56.

Although the invention has been described in detail with reference to specific embodiments, variations and modifications exist within the scope and spirit of the invention as described and defined in the following claims.

What is claimed is:

1. An infant support for an incubator or infant warmer or a combination thereof, the support comprising:
   a frame,
   a mattress tray disposed above the frame,
   an x-ray tray, and
   one or more weight cells, the mattress tray being supported above the frame by the one or more weight cells, the frame being formed to include a space for receiving the x-ray tray to be below an infant supported on the mattress tray, and a portion of the one or more weight cells extending through an opening of the frame to engage the x-ray tray.

2. An infant support for an incubator or infant warmer or a combination thereof, the support comprising:
   a frame,
   a mattress tray disposed above the frame,
   an x-ray tray, and
   one or more weight cells, the mattress tray being supported above the frame by the one or more weight cells, and the frame being formed to include a space for receiving the x-ray tray to be below an infant supported on the mattress tray,
   in which the frame has a head end, a foot end, and longitudinally extending sides, the x-ray tray being movable laterally into and out of the space under one side of the frame.

3. The apparatus of claim 2 in which the frame provides longitudinally spaced, laterally extending tracks, depending therefrom to slidably receive the x-ray tray.

4. The apparatus of claim 2 in which the frame is formed from plastic to have a downwardly facing surface, the downwardly facing surface being formed to provide a pair of longitudinally spaced apart, transversely extending tracks, to slidably receive the x-ray tray beneath the frame.

5. The apparatus of claim 1 in which the mattress tray is mounted for vertical movement on the frame, and the one or more weight cells are disposed on the frame to provide an output corresponding to the weight of the mattress tray and any infant or accessories carried by the mattress tray.

6. An infant support for an incubator or infant warmer or a combination thereof, the support comprising:

a frame a mattress tray disposed above the frame, an x-ray tray, and one or more weight cells, the mattress tray being supported above the frame by the one or more weight cells, and the frame being formed to include a space for receiving the x-ray tray to be below an infant supported on the mattress tray, in which the frame has a head end, a foot end, and longitudinally extending sides, defining four corner portions and further comprising an actuator extending upwardly from weight cells mounted in each corner portion, the mattress tray having corner portions disposed respectively above the corner portions of the frame, each corner portion of the mattress tray being provided with an opening for receiving the actuator extending from the weight cell mounted in the frame portion corner therebelow.

7. The apparatus of claim 6 in which the mattress tray has a head end, a foot end and longitudinally extending sides disposed respectively above the head end, foot end, and longitudinally extending sides of the frame, and the mattress tray being formed of plastic.

8. The apparatus of claim 7 in which the frame tray is formed to provide a pair of longitudinally spaced apart, transversely extending tracks depending from the frame tray slidably to receive the x-ray tray removably to position the x-ray tray under an infant resting on the mattress tray supported above the frame.

9. The apparatus of claim 8 in which each track is formed to have a track slide surface portion extending along the track and toward the other track, the x-ray tray being provided with opposite side edge portions configured to engage and slide on the track slide surface portions.

10. The apparatus of claim 1 wherein the frame is configured to be supported upon a tilt mechanism of the incubator or infant warmer or a combination thereof and cooperates with the tilt mechanism to selectively position an upwardly facing surface of the mattress tray in a substantially level position and a Trendelenberg position.

11. An infant support comprising a base having an upwardly facing surface, a tilt mechanism extending above the upwardly facing surface, a frame having a head end, a foot end, a downwardly facing surface and longitudinally extending sides, the frame ends and sides intersecting to define four frame corner portions, the frame being supported by the tilt mechanism to provide a space between the downwardly facing surface of the frame and the upwardly facing surface of the base, a mattress tray having a head end, a foot end, and longitudinally extending sides disposed generally above respectively the head end, the foot end and the sides of the frame, the mattress tray ends and sides intersecting to define four tray corner portions disposed respectively above the frame corner portions, a weight cell mounted to each frame corner portion, each weight cell comprising an upstanding sensor element to support the tray corner portion thereabove, the frame having at least one opening defined by one of the frame sides disposed therebelow, said opening communicating with the space, and an x-ray tray configured to move through the opening into and out of the space.

12. The apparatus of claim 11 wherein each tray corner portion includes an opening which receives the actuator extending from the weight cell.

13. The apparatus of claim 11 in which the mattress tray is supported for vertical movement downwardly against the weight cell sensor elements.

14. The apparatus of claim 11 in which the frame comprises a pair of longitudinally spaced, transversely extending tracks depending from the frame slidably to receive the x-ray tray.

15. The support of claim 14 in which the x-ray tray is formed with side edges configured to slidably engage the tracks.

16. An infant support assembly for use in an incubator or infant warmer, the assembly comprising:

a frame formed to have an upwardly facing surface, an underside, a head end, a foot end, and longitudinally extending sides, the frame ends and sides intersecting to define four frame corner portions and further comprising a actuator opening formed in each corner portion, the frame being formed to have depending from the underside a pair of longitudinally spaced transversely extending tracks, the underside of the frame and the tracks defining a space having at least one opening defined by one of the frame sides, a weight cell mounted to the underside of the frame disposed at each frame corner portion, each weight cell comprising an actuator extending upwardly from a sensor element through its associated actuator opening, a plastic mattress tray formed to have a head end, a foot end, and longitudinally extending sides disposed generally above respectively the head end, the foot end and the sides of the frame, the tray having a bottom surface, the mattress tray ends and sides intersecting to define four tray corner portions disposed respectively above the frame corner portions, each tray corner portion being formed with an aperture to receive the actuator extending from the associated weight cell therebelow, and an x-ray tray formed with side edges, configured to slidably engage the tracks depending from the frame, and configured to move through the opening into and out of the space.

17. An infant support for an incubator or infant warmer or a combination thereof, the support comprising:

a frame, a mattress tray disposed above the frame, an x-ray tray, and one or more weight cells, the mattress tray being supported on the frame by the one or more weight cells, the frame and mattress tray providing a space therebetween for receiving the x-ray tray to be below an infant supported on the mattress tray, and a portion of the one or more weight cells extending through an opening of the frame to engage the x-ray tray.

18. An infant support for an incubator or infant warmer or a combination thereof, the support comprising:

a frame, a mattress tray disposed above the frame, an x-ray tray, and one or more weight cells, the mattress tray being supported on the frame by the one or more weight cells, and the frame and mattress tray providing a space therebetween for receiving the x-ray tray to be below an infant supported on the mattress tray, in which the mattress tray has a head end, a foot end, and longitudinally extending sides, the x-ray tray being movable transversely into and out of the space under one side of the mattress tray.

19. The infant support of claim 18 in which the mattress tray provides longitudinally spaced, transversely extending tracks, depending therefrom to slidably receive the x-ray tray.

20. The infant support of claim 18 in which the mattress tray is formed from plastic to have an upwardly facing surface for receiving a mattress and a downwardly facing surface, the downwardly facing surface being formed to provide a pair of longitudinally spaced apart, transversely extending tracks, to slidably receive the x-ray tray beneath the mattress tray.

21. The infant support of claim 17 in which the mattress tray is mounted for vertical movement on the frame, and the one or more weight cells are disposed on the frame to provide an output corresponding to the weight of the mattress tray and any infant or accessories carried by the mattress tray.

22. An infant support for an incubator or infant warmer or a combination thereof, the support comprising:
   a frame,
   a mattress tray disposed above the frame,
   an x-ray tray, and
   one or more weight cells, the mattress tray being supported on the frame by the one or more weight cells, and the frame and mattress tray providing a space therebetween for receiving the x-ray tray to be below an infant supported on the mattress tray,
   in which the frame has a head end, a foot end, and longitudinally extending sides, defining four corner portions and further comprising a post extending upwardly from each corner portion, the mattress tray having corner portions disposed respectively above the corner portions of the frame, each corner portion of the mattress tray being provided with an opening for receiving the post on the frame portion corner therebelow, the mattress tray being freely movable upwardly and downwardly as guided by the corner posts.

23. The infant support of claim 22 in which the one or more weight cells comprise one weight cell disposed in association with each corner posts each weight cell comprising an upstanding sensor supporting the mattress tray.

24. The infant support of claim 22 in which the mattress tray has a head end, a foot end and longitudinally extending sides disposed respectively above the head end, foot end, and longitudinally extending sides of the frame, and the mattress tray being formed of plastic.

25. The infant support of claim 24 in which the mattress tray is formed to provide a pair of longitudinally spaced apart, transversely extending tracks depending from the mattress tray slidably to receive the x-ray tray removably to position the x-ray tray under an infant resting on the mattress tray.

26. The infant support of claim 25 in which each track is formed to have a track slide surface portion extending along the track and toward the other track, the x-ray tray being provided with opposite side edge portions configured to engage and slide on the track slide surface portions.

27. An infant support comprising a frame having a head end, a foot end and longitudinally extending sides, the frame ends and sides intersecting to define four frame corner portions, a mattress tray having a head end, a foot end, and longitudinally extending sides disposed generally above respectively the head end, the foot end and the sides of the frame, the mattress tray ends and sides intersecting to define four tray corner portions disposed respectively above the frame corner portions, a weight cell disposed on each frame corner portion, each weight cell comprising an upstanding sensor element to support the tray corner portion thereabove, the frame and tray defining a space therebetween having at least one opening defined by one of the frame sides and the tray side disposed thereabove, and an x-ray tray configured to move through the opening into and out of the space.

28. The infant support of claim 27 comprising a guide post extending upwardly from each frame corner portion and each tray corner portion having an opening which slides downwardly over the post on the frame corner portion therebelow.

29. The infant support of claim 27 in which the mattress tray is mounted on the frame for vertical movement downwardly against the weight cell sensor elements.

30. The infant support of claim 27 in which the mattress tray comprises a pair of longitudinally spaced, transversely extending tracks depending from the tray slidably to receive the x-ray tray.

31. The support of claim 30 in which the x-ray tray is formed with side edges configured to slidably engage the tracks.

32. An infant support assembly for use in an incubator or infant warmer, the assembly comprising:
   a frame formed to have an upwardly facing surface, a head end, a foot end, and longitudinally extending sides, the frame ends and sides intersecting to define four frame corner portions and further comprising a post extending upwardly from each corner portion,
   a plastic mattress tray formed to have a head end, a foot end, and longitudinally extending sides disposed generally above respectively the head end, the foot end and the sides of the frame, the tray having a bottom surface, the mattress tray ends and sides intersecting to define four tray corner portions disposed respectively above the frame corner portions, each tray corner portion being formed with an aperture to receive the post on the frame corner portion therebelow, the tray being formed to have depending from the bottom surface a pair of longitudinally spaced transversely extending tracks,
   a weight cell disposed on each frame corner portion, each weight cell comprising an upstanding sensor element to engage and support the tray corner portion thereabove, the frame and tray defining a space therebetween having at least one opening defined by one of the frame sides and the tray side disposed thereabove,
   an x-ray tray formed with side edges, configured to slidably engage the tracks depending from the mattress tray, and configured to move through the opening into and out of the space defined between the frame and the mattress tray.

33. An infant support system comprising:
   a base including a longitudinal axis, a lateral axis and an upwardly facing surface from which extends a support of a tilt mechanism displaced vertically above the upwardly facing surface;
   a frame configured to be supported by the support of the tilt mechanism above and spaced apart from the upwardly facing surface;

a weight cell having a sensor extending therefrom, said weight cell being mounted to the frame to have the sensor extend upwardly from the frame;

a mattress tray having an upwardly facing support surface, the mattress tray being supported by the sensor of the weight cell above and spaced apart from the frame and the tilt mechanism, the frame and mattress tray cooperating to selectively provide an inclination to the support surface of the mattress tray;

an x-ray film tray configured to be slidably received in a space below the support surface of the mattress tray; and a tilt sensor sensing the inclination of the support surface;

wherein the tilt sensor and weight cell cooperate to provide an indication of the weight supported by the mattress tray regardless of the inclination of the support surface.

34. The apparatus of claim 33 wherein x-ray film carried in the x-ray film tray received in the space below the support surface will provide an x-ray image of an infant supported above the mattress tray while the frame is supported by the support of the tilt mechanism.

35. The apparatus of claim 34 further comprising a plurality of weight cells each having a sensor extending therefrom, each of said weight cells being mounted to the frame to have the sensor extend upwardly from the frame and wherein the tilt sensor and plurality of weight cells cooperate to provide an indication of the weight supported by the mattress tray regardless of the inclination of the support surface.

36. The apparatus of claim 35 wherein the x-ray film tray is slidably received in a space between the frame and the upwardly facing surface of the base.

37. The apparatus of claim 36 further comprising tracks extending downwardly from the frame, said tracks being configured to engage said x-ray film tray and support the x-ray film tray for lateral movement relative to the frame into and out of the space.

38. The apparatus of claim 37 wherein the frame is supported on the support of the tilt mechanism for lateral movement of the frame relative to the base.

39. The apparatus of claim 35 wherein the x-ray film tray is slidably received in a space between the mattress tray and the frame.

40. The apparatus of claim 39 further comprising tracks extending downwardly from the mattress tray, said tracks being configured to engage said x-ray film tray and support the x-ray film tray for lateral movement relative to the mattress tray into and out of the space.

41. The apparatus of claim 40 wherein the frame is supported on the support of the tilt mechanism for lateral movement of the frame relative to the base.

* * * * *